(12) United States Patent
Nordqvist et al.

(10) Patent No.: US 8,209,523 B2
(45) Date of Patent: Jun. 26, 2012

(54) DATA MOVING PROCESSOR

(75) Inventors: Ulf Nordqvist, Munich (DE); Jinan Lin, Ottobrunn (DE); Xiaoning Nie, Neubiberg (DE); Stefan Maier, Augsburg (DE); Siegmar Koeppe, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 414 days.

(21) Appl. No.: 12/358,048

(22) Filed: Jan. 22, 2009

(65) Prior Publication Data

US 2010/0185832 A1 Jul. 22, 2010

(51) Int. Cl.
G06F 13/00 (2006.01)
G06F 12/00 (2006.01)

(52) U.S. Cl. .......................................... 712/225; 710/74
(58) Field of Classification Search .................. None
See application file for complete search history.

(56) References Cited

U.S. PATENT DOCUMENTS

| | | | | |
|---|---|---|---|---|
| 5,960,212 A * | 9/1999 | Mak | ................. | 712/34 |
| 6,026,485 A * | 2/2000 | O'Connor et al. | ............ | 712/226 |
| 6,349,383 B1 * | 2/2002 | Col et al. | ....................... | 712/226 |
| 7,113,985 B2 * | 9/2006 | Narad et al. | .................. | 709/221 |
| 7,660,967 B2 * | 2/2010 | Hutson | ............................. | 712/9 |
| 2002/0138715 A1 * | 9/2002 | Minematsu | .................... | 712/225 |
| 2003/0023831 A1 * | 1/2003 | Deveruex | ........................ | 712/34 |
| 2005/0071602 A1 * | 3/2005 | Niell et al. | ..................... | 712/202 |
| 2006/0080478 A1 | 4/2006 | Seigneret et al. | | |
| 2008/0071991 A1 * | 3/2008 | Shaw et al. | ................... | 711/132 |

OTHER PUBLICATIONS

Koopman, Philip, Jr., "Stack Computers: The New Wave," 1989, 234 pages, Ellis Horwood Limited, England.
Arm Limited, "PrimeCell© DMA Controller (PL080), Revision: r1p3," Technical Reference Manual, 2000-2001, 2003-2005, 144 pages.
Schöberl, Martin, "JOP: A Java Optimized Processor for Embedded Real-Time Systems," Dissertation, Institut für Technische Informatik, Jan. 2005, 253 pages.

* cited by examiner

Primary Examiner — Eric Coleman
(74) Attorney, Agent, or Firm — Eschweiler & Associates, LLC

(57) ABSTRACT

A data moving processor includes a code memory coupled to a code fetch circuit and a decode circuit coupled to the code fetch circuit. An address stack is coupled to the decode circuit and configured to store address data. A general purpose stack is coupled to the decode circuit and configured to store other data. The data moving processor uses data from the general purpose stack to perform calculations. The data moving processor uses address data from the address stack to identify source and destination memory locations. The address data may be used to drive an address line of a memory during a read or write operation. The address stack and general purpose stack are separately controlled using bytecode.

30 Claims, 3 Drawing Sheets

DATA MOVING PROCESSOR

TECHNICAL FIELD

The present invention relates generally to a system and method for moving data in a programmable data moving processor (DMP) and, more particularly, to a DMP using bytecode and incorporating a stack-based architecture having separate general purpose and address stacks.

BACKGROUND

In broadband communication systems, moving data between processors, memory locations, and ports is one of the most critical tasks. Typically, a modem receiver transfers data from a receiving FIFO to memory storage, coprocessors, such as a cyclic redundancy check (CRC) checker, and bit-alignment circuits. The data may be further transferred to a host processor, backplane interface or other destination. In the case of a modem transmitter section, the data is transferred among the same components in the reverse direction. The data-moving function is one of the biggest users of the CPU in high-speed modems.

FIG. 1 illustrates a typical distribution of CPU cycles 100 for a modem providing the High-Speed Downlink Packet Access (HSDPA) communications protocol. Chart 100 illustrates relative amounts of processing time required for each of the functions in list 101. As shown in the FIG. 1, the data-handling functions, such as data copy 102, data storage 103, and memory allocation 104 operations account for almost three-quarters of the CPU cycles. On the other hand, radio link control (RLC) packet data unit (PDU) allocation 105, RLC header decoding 106, and other 107 data-processing operations account for only about one-quarter of the CPU cycles.

To increase data-transfer rates, data-moving functions have been implemented in prior hard-wired circuits. For example, dedicated data-move accelerators may be used in VDSL and HSDPA chips. These accelerators are specialized for specific tasks—i.e. VDSL or HSDPA applications—and have limited configurability. As a result, known data-move accelerators cannot be reused with other protocols or in other contexts. A significant amount of time and effort are required for the design and verification of the hardwired data-move accelerator blocks in each generation of the chips. Additionally, further evolution (i.e. later versions) of protocol standards are difficult or impossible to implement in an existing data-move chip after it has been designed.

The standard solution for data transfer is a direct memory access (DMA) Controller, which is well-known for use in moving data between a CPU, memory and peripherals. The basic function of a DMA controller is to move a sequence of data from a source address to a destination address. The host CPU normally configures the DMA control registers with relevant parameters, such as source address, destination address, and number of words to transfer, and retrieves execution states from the status registers.

More advanced DMAs, such as the ARM PrimeCell DMA Controller (PL080), may work through a linked list of descriptors with a predefined list structure. These DMA controllers set status registers to indicate IDLE, RUN, and ERROR states and send interrupts to the host processor upon termination or error conditions. Generally, a DMA controller provides simple acceleration functions and relies on the intelligence of the host controller. The host CPU is frequently interrupted for high bandwidth data transfers, which significantly degrades the performance of the CPU for other tasks. Even if the host processor has the ability to hide interrupt latency, using multithreading, for example, the configuration parameters have to be updated frequently, such as for each data frame, which causes further performance degradation of the host CPU.

SUMMARY OF THE INVENTION

These and other problems are generally solved or circumvented, and technical advantages are generally achieved, by preferred embodiments of the present invention that provides a stack-based data moving processor (DMP) that enables a very compact code size. Embodiments of the present invention provide both a general purpose data stack and a separate address stack. The stack-based DMP has dedicated stacks that allow for separate storage of address data and provide for direct data moves among memory locations, ports and coprocessors.

The intelligent DMP engine disclosed herein is more flexible than hardwired engines and is more efficient compared to systems using RISC CPUs. Embodiments of the DMP provide a programmable order of processing, programmable source and destination, and allows the user to program additional operations on the data. Additionally, embodiments of the invention allow for the use of a very compact code because there is no need to define register file addresses. Unlike known DMA controllers, the DMP disclosed herein does not need to identify register addresses and, therefore, register address bits are eliminated allowing for a smaller code size. The simpler hardware and specialized data move instructions provide for higher performance in the intelligent DMP when compared to traditional DMA controllers.

In accordance with one embodiment of the invention, a data moving processor comprises a code memory interface coupled to a code fetch circuit, and a decode circuit coupled to the code fetch circuit. An address stack is coupled to the decode circuit and configured to store address data, and a general purpose stack is coupled to the decode circuit and configured to store other data. The address data identifies a particular memory location and may be used to drive a memory address line during a memory read or write operation. The address stack may be connected to an address port of a bus or an address line of a memory. The data in the general purpose stack is used to perform calculations within the data moving processor. The address stack and general purpose stack are separately controlled using bytecode.

The data moving processor further comprises a coprocessor interface coupled to a plurality of coprocessors, wherein each coprocessor is assigned a unique identifier. The data moving processor comprises a port interface coupled to a plurality of ports, wherein each port is assigned a unique identifier. The bytecode may comprise push and pop commands to move data between the general purpose stack and a coprocessor, port or memory.

The data moving processor may further comprise an address calculation unit coupled to the address stack and an arithmetic logic unit coupled to the general purpose stack. The data moving processor may include a branch and loop circuit coupled to the address stack and the general purpose stack, the branch and loop circuit providing updated address data for use in the movement of data from the general purpose stack to a destination address. The updated address data may be calculated, for example, by the address calculation unit which increments or decrement a pointer to location in a memory. The address data may be calculated using any now known or later developed process or method.

In accordance with another embodiment of the invention, a method for processing data in a data moving processor comprises loading program code from a code memory, decoding instructions from the program code, loading address data to an address stack, loading other data to a general purpose stack in parallel to loading the address data to the address stack, and moving data from the general purpose stack to a destination address identified from the address stack. Bytecode instructions may be loaded to control the address stack and the general purpose stack. The bytecode may comprise push and pop commands to move data between the general purpose stack and a coprocessor, port, or memory interface.

The data moving processor may load data from the general purpose stack to an Arithmetic Logic Unit (ALU) for processing. The data moving processor may load address data from the address stack to an address calculation unit for processing. The sequential movement of data may be controlled using a branch and loop circuit. The destination address may correspond to a memory, port, or coprocessor.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The present invention provides many applicable inventive concepts that can be embodied in a wide variety of specific contexts. The specific embodiments discussed are merely illustrative of specific ways to make and use the invention, and do not limit the scope of the invention.

The present invention is directed to a flexible DMP having an instruction set architecture (ISA) having a high code-density and flexibility to efficiently move data between memory locations, coprocessors, ports, FIFO buffers, etc. Embodiments of the intelligent DMP engine disclosed herein use a bytecode and stack-based instruction set architecture that is specialized for accelerating data move functions. The DMP engine implements specialized instructions for moving data between memory locations, coprocessors and port interfaces, for example. The instructions are encoded so as to achieve a small overall code size. The proposed ISA takes advantage of a separate address stack in addition to the general purpose data stack. The address stack holds holding source and/or destination addresses, such as memory locations, coprocessors, and port interfaces. The ISA may be extended to support multithreading in, for example, multi-channel applications.

Figure 1:
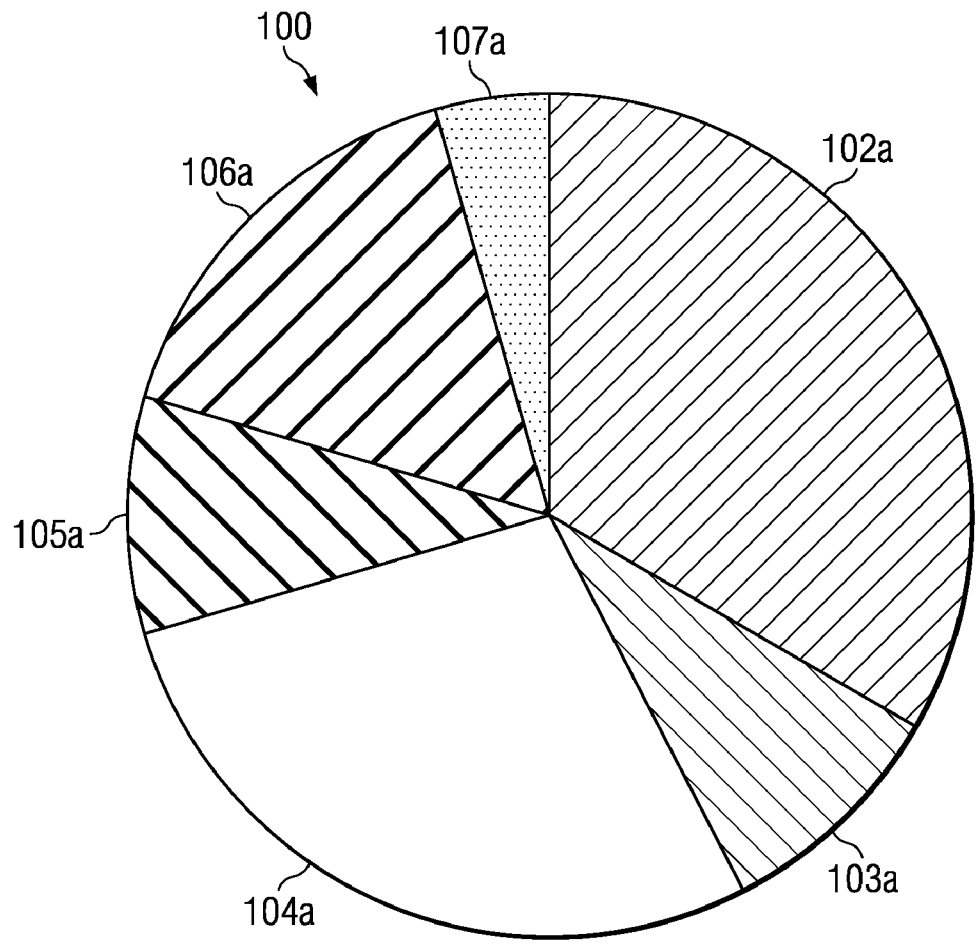
FIG. 1 illustrates a typical distribution of CPU cycles in a modem.
Figure 1:
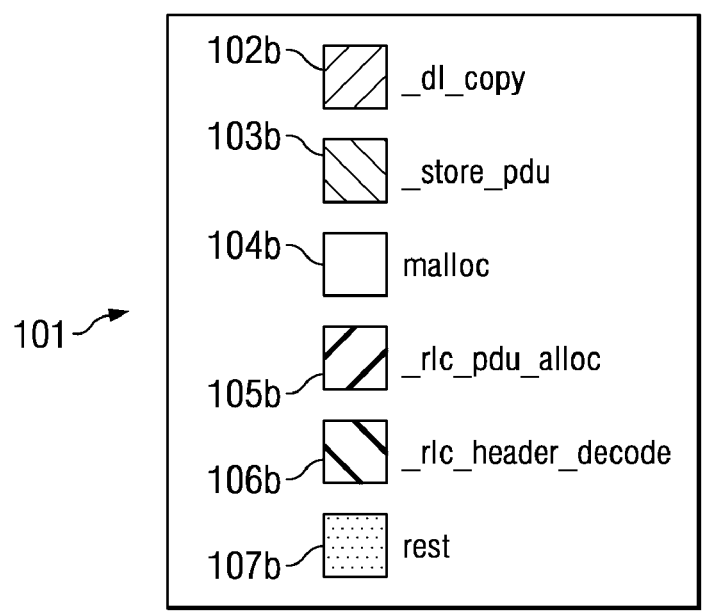
Figure 2:
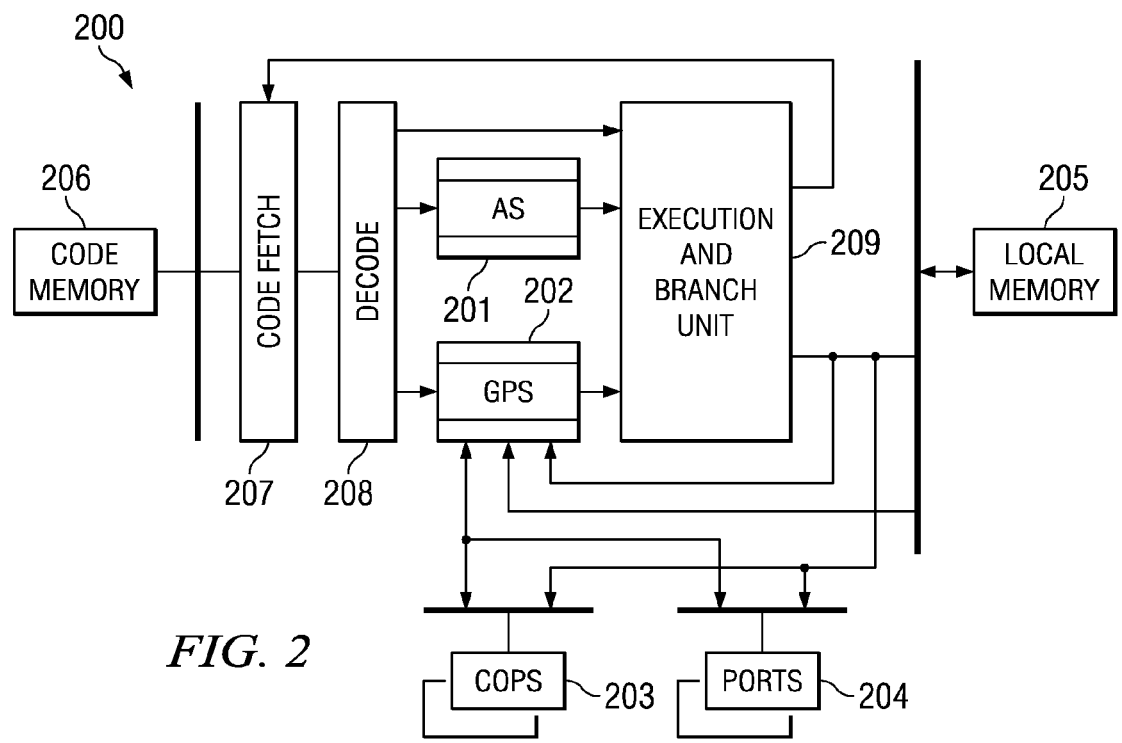
FIG. 2 is a schematic diagram of one embodiment of a core stack of an intelligent DMP engine having separate address and general purpose stacks.

The DMP uses variable-length instructions that are encoded into one or more octets (bytecode). The DMP uses a core stack architecture to store internal data instead of using typical registers. As illustrated in FIG. 2, the core stack in intelligent DMP engine 200 consists of separate address (201) and general purpose (202) stacks. Address stack (AS) 201 supports source and destination address data. Data is loaded to general purpose stack (GPS) 202, such as from a memory, coprocessor or port, via a PUSH function. The data is loaded from a source address for the memory location, coprocessor number, or port that is stored on address stack 201. Data is stored to a memory or moved to a port or coprocessor via a POP function. The destination address of the memory location, coprocessor number, or port is stored on address stack 201. Specialized PUSH and POP instructions are used to transfer data to/from coprocessors 203, data ports 204 and memory 205. Address data on address stack 201 is used to support PUSH and POP operations and to generate a next address where multiple memory locations are used. In one embodiment, for example, an initial address location may be retrieved from address stack 201 as a destination or source address. A next address may be generated by a bytecode instruction by automatically incrementing or decrementing initial address location, which functions, for example, as the pointer to a linear array.

Code fetch circuit 207 loads instructions from code memory 206 and provides the instructions to decoding logic 208. Decoding logic 208 analyses the instruction encoding and loads address data to address stack 201 and other data to general purpose stack 202. Other instructions are provided to execution and branch unit 209, which performs operations such as calculations and arithmetic logic unit functions on the data stored to general purpose stack 202. Additionally, execution and branch unit 209 operates on instructions to move data between general purpose stack 202 and memory 205, coprocessors 203, or ports 204.

Coprocessors 203 may include, for example, a CRC coprocessor for performing cyclic redundancy check operations and a ciphering coprocessor for encrypting/decrypting data. Each coprocessor may be identified by a number, such as coprocessor 0 may be a CRC coprocessor and coprocessor 1 may be a ciphering coprocessor. Execution and branch unit 209 may receive instructions that may require CRC or ciphering operations. The instructions would cause the execution and branch unit 209, for example, to load data from the top of general purpose stack 202 or from a memory location to the designated coprocessor. The coprocessor may be identified using address data, such as coprocessor 0 or coprocessor 1, from address stack 201. Execution and branch unit 209 may also send control bits to the designated coprocessor to indicate which operations should be performed on the data. Subsequent instructions may then move the data from the coprocessor back to general purpose stack 202 or to memory 205 or port 204.

Ports 204 provide a simple interface to external hardware and provide a means to move data to and from the external hardware. Data may be moved to and from external hardware, for example, using a read or write instruction that identifies port 204 as a destination or source address.

Figure 3:
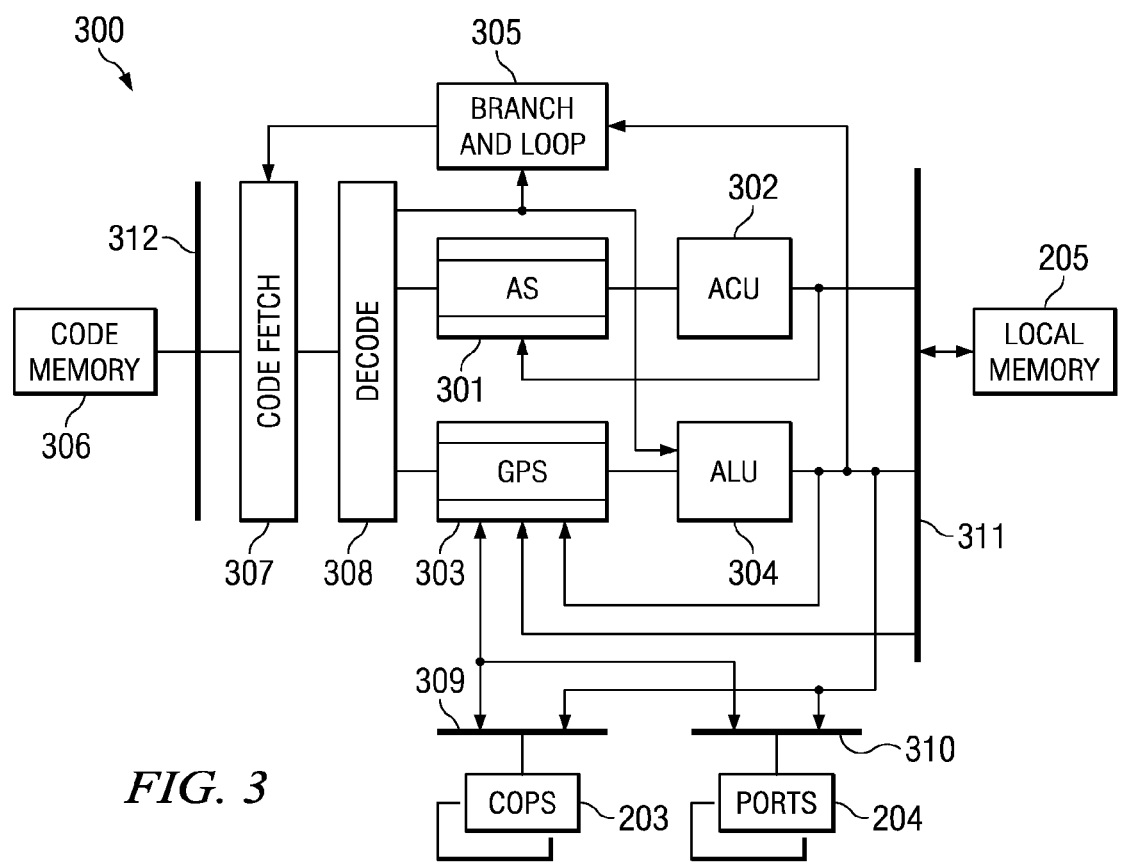
FIG. 3 is a schematic diagram of another embodiment of an intelligent DMP having its own Address Calculation Unit (ACU)

FIG. 3 illustrates another embodiment of the intelligent DMP 300. In DMP 300, address stack 301 has its own Address Calculation Unit (ACU) 302, and general purpose stack 303 is coupled to Arithmetic Logic Unit (ALU) 304. ACU 302 may perform address calculations in parallel to ALU 304 operations. For example, ALU 304 may load (e.g. POP) a first data value from the top of general purpose stack 303 and then load (e.g. POP) the next data value from the top of general purpose stack 303. Instructions from decode logic 308 may then command ALU 304 to add or otherwise operate on the data. ALU 304 may then store (e.g. PUSH) the result back to general purpose stack 303 or move the data to coprocessor 203, port 204 or memory 205.

DMP 300 may also include branch and loop circuit 305 to support repeat instructions or to control the movement of a sequence of data. For example, branch and loop circuit 305 may load (e.g. POP) address data from the top of address stack 301. The address may be a pointer to the first location in an array, such as a linear array of data. Branch and loop circuit may then successively increment or decrement the address data so that operations, such as a load or store operation, can be performed on each address location of the array.

Code fetch circuit 307 loads instructions from code memory 306 and provides the instructions to decoding logic 308. Decoding logic 308 analyses the instruction encoding and extracts the information, such as a counter, to control start and end of loop execution. Internal buses 309-312 enable read and write access to coprocessors 203, ports 204 and memories 205, 306.

In one embodiment, DMP 300 is pipelined to reach a high clock frequency. DMP 300 may have 2 or more pipeline stages. In a two-pipeline-stage implementation, for example, instruction fetch and decoding are accomplished in a first pipeline stage and execution/write back occur in a second pipeline stage. In a three-pipeline-stage implementation, instruction fetch is accomplished in a first stage, decoding in a second stage, and execution/write back in a third pipeline stage. In other embodiments, DMP 300 may implement multithreading by providing a separate core stack for each thread.

Table 1 illustrates an exemplary instruction set for the stack-based DMP disclosed herein. The exemplary DMP code shown in Table 1 represents an instruction sequence for moving eight data words from a source (src) memory location to a destination (dst) memory location. As illustrated in Table 1, the present DMP invention requires a code size of only 8 bytes to accomplish this operation, while a typical RISC CPU would require a code size of 20 bytes to perform the same task.

TABLE 1

| DMP Code | Size | RISC Code | Size |
| --- | --- | --- | --- |
| ld_src | 3 | ldi src | 4 |
| ld_dst | 3 | ldi dst | 4 |
| ld8_w+ | 1 | loop 8 | 4 |
| st8_w+ | 1 | ldr src+ | 4 |
|  |  | str dst+ | 4 |
|  |  | end loop |  |
| Total Code Size: | 8 | Total Code Size: | 20 |

The source and destination addresses are identified in the ld_src and ld_dst instructions, respectively. These instructions include two bytes of address data and one byte of instruction (for example, load) for a total size of three bytes each. The address data may be loaded to the address stack in the DMP. Instructions ld8_w+ and st8_w+, which are only one byte each, perform the data move function, with an implicit loop of eight times, by loading data from the source (src) address and then storing the data to the destination (dst) address eight times. The data is loaded (PUSH) to the general purpose stack from the source address by the ld8_w+ instruction, and then stored (POP) from the general purpose stack to the destination address by the st8_w+ instruction. After loading the first data word from the initial source address (src) and storing to the initial destination address (dst), an auto increment circuit increments the source and destination addresses data to identify the locations to move (i.e. load/store) the next data word. The branch and loop circuit controls the repeated load/store operation eight times in total.

As noted above, the code required to move this data using the DMP device is only eight (8) bytes. Instructions for a RISC-based CPU performing a similar operation would required a total of 20 bytes as illustrated in Table 1. By using the general purpose and address stacks, the DMP bytecode for the data move function is more compact and efficient.

Table 2 illustrates a data move function combined with coprocessor processing in which data is moved to memory and a copy of the data is passed to the CRC coprocessor. As shown in Table 2, the total code sizes again illustrate that the DMP bytecode is more compact and efficient compared to the code for a RISC CPU.

TABLE 2

| DMP Code | Size | RISC Code | Size |
| --- | --- | --- | --- |
| ld_src | 3 | ldi src | 4 |
| ld_dst | 3 | ldi dst | 4 |
| repeat N | 3 | loop i | 4 |
| ld_w+ | 1 | ldr src | 4 |
| push_cop | 1 | str dst | 4 |
| st_w+ | 1 | mvr2p | 4 |
| end repeat |  | end loop |  |
| popw_cop | 1 | mvp2r | 4 |
| st_w+ | 1 | str dst | 4 |
| Total Code Size: | 14 | Total Code Size: | 32 |

The source and destination addresses are identified in the ld_src and ld_dst instructions, respectively. The address data may be loaded to the address stack in the DMP. The ld_w+ function loads a data byte from the source address to the general purpose stack. The source address may be loaded from the address stack. The push_cop instruction moves the data from the top of the general purpose stack to a coprocessor. If the system includes multiple coprocessors, the push_cop instruction identifies a specific coprocessor. The push_cop instruction may also include control bits that instruct the coprocessor to perform a particular operation, such as a CRC function.

The st8_w+ instruction stores the data from the general purpose stack to the destination (dst) address. The destination address may be loaded from the address stack. The repeat N and end repeat instructions cause the ld_w+, push_cop, and st_w+ instructions to repeat N times. A branch and loop circuit may be used to control the number of times (N) the data is loaded, pushed to a coprocessor, and stored. The original source (src) and destination (dst) addresses that are loaded to the address stack may be pointers to memory arrays. The branch and loop circuit may increment the source and destination addresses data to identify the locations to move (i.e. load/store) each byte. The branch and loop circuit increments the address data N times in this example.

The popw_cop instruction fetches data, such as a CRC result, from the coprocessor and stores the coprocessor data to the general purpose stack. The last st_w+ instruction stores the coprocessor data from the general purpose stack to a memory location. Similar to the example of Table 1, the DMP code illustrated in Table 2 for moving data to and from a coprocessor and memory is smaller (14 bytes) than the code that would be required for similar operations in a RISC CPU system (32 bytes).

The present invention differs from the exiting DMA controllers in that it is not controlled by configuration registers or list structures stored in data memory. Instead, the DMP has its own code memory (206, 306) and the execution is fully controlled by the own instruction set. In known DMAs, there is no CPU dedicated to data movement that relies on byte codes and that uses an extended core stack with a separate stack for source and destination addresses.

Bytecode machines are known in the implementation of a Java virtual machine; however, the exiting Java implementations are based on a single general purpose stack because of the generality of the applications. The DMP is a bytecode-programmed data moving engine that makes use of a separate address stack in addition to—and in parallel to—the general purpose stack.

Figure 4:
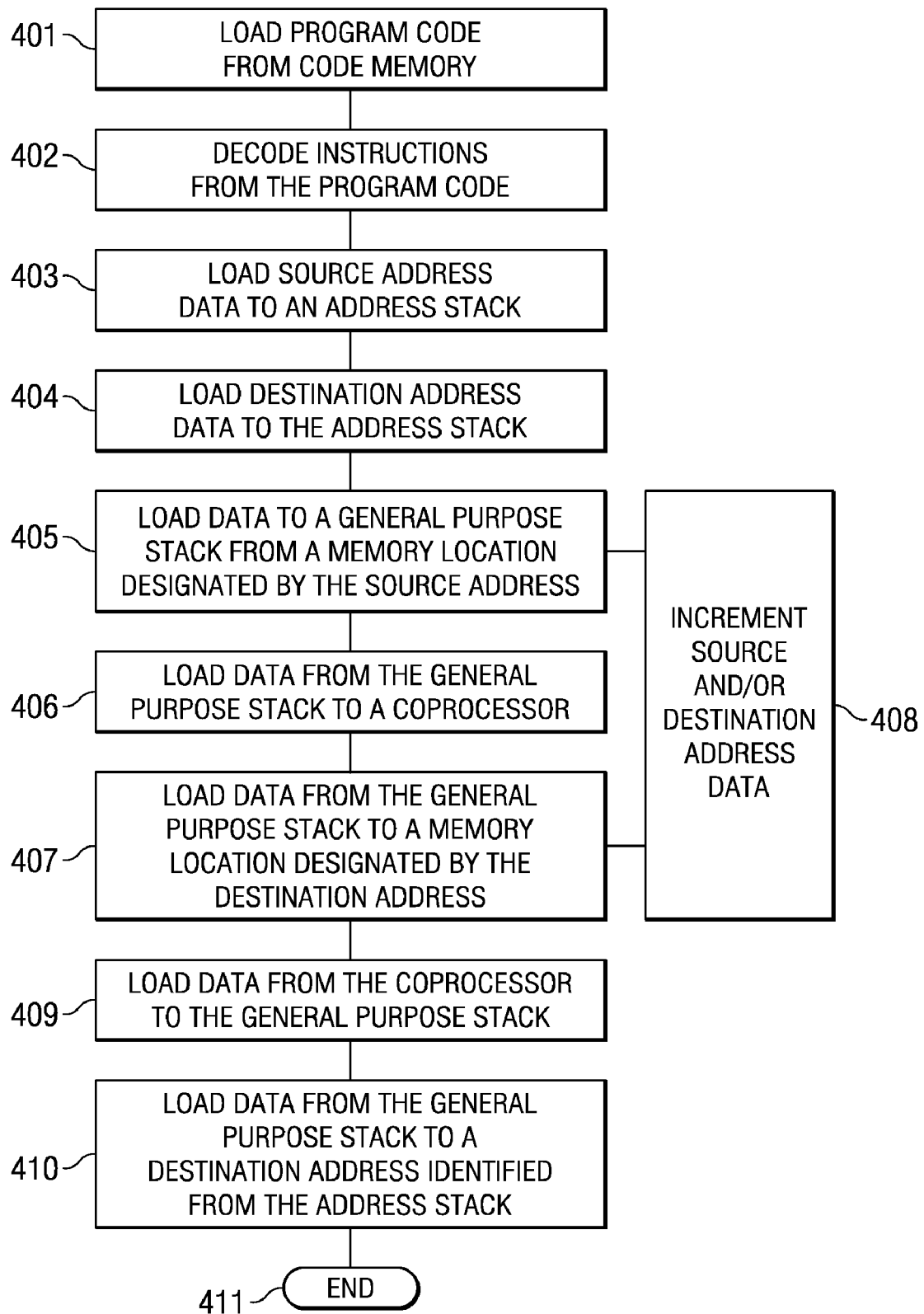
FIG. 4 is a flowchart illustrating an exemplary embodiment of a method for using the invention.

FIG. 4 illustrates a flowchart for an exemplary embodiment of a method for moving data. It will be understood that the method shown FIG. 4 is merely an illustrative example and embodiments of the invention are limited to such a process. The method illustrated in FIG. 4 may correspond to the code illustrated in Table 2, for example. The method illustrated in FIG. 4 may be implemented, for example, using DMP 200 (FIG. 2) or 300 (FIG. 3), but is not intended to be limited to such a configuration. Moreover, it will be understood that the steps of the method illustrated in FIG. 4 may be performed in the order indicated, or in any other order, or simultaneously, or in conjunction with other steps or methods. In step 401, program code is loaded from code memory and, in step 402, the instructions are decoded from the program code. In step 403, source address data is loaded to an address stack and, in step 404, destination address data is loaded to the address stack. This address data may be loaded, for example, by pushing address data to the top of the address stack.

In step 405, data is loaded to a general purpose stack from a memory location designated by the source address. This may be accomplished, for example, by popping source address data from the address stack, loading data from the source address, and then pushing the data to the general purpose stack. In step 406, data is loaded from the general purpose stack to a coprocessor. This may be accomplished in the DMP by popping data from the top of the general purpose stack and then sending the data to a coprocessor. The DMP may include control bits in the data sent to the coprocessor to identify the operations to be performed by the coprocessor.

In step 407, data is loaded from the general purpose stack to a memory location designated by the destination address. This may be accomplished by popping a destination location from the address stack and popping other data from the general purpose stack. The DMP then stores the data to the destination address. The process flows to step 408 if, for example, the instructions in steps 405-407 are to be repeated. In step 408, a branch and loop circuit may increment or decrement address data to be used for a next data-move iteration. After the instructions have repeated a desired number of times, the process moves to step 409 in which data is loaded from the coprocessor to the general purpose stack. The DMP may pop data from the coprocessor and then push the data to the top of the general purpose stack. In step 410, the data is popped from the general purpose stack and loaded to a destination address. The destination address may be popped from the address stack. The process ends in step 411.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A data moving processor, comprising:
   a code memory interface coupled to a code fetch circuit;
   a decode circuit coupled to the code fetch circuit;
   an address stack coupled to the decode circuit and configured to store address data; and
   a general purpose stack coupled to the decode circuit and configured to store other data, wherein the general purpose stack and the address stack operate in parallel.

2. The data moving processor of claim 1, wherein the address data identifies a particular memory location.

3. The data moving processor of claim 1, wherein the address data is used to drive a memory address line during a memory read or write operation.

4. The data moving processor of claim 1, wherein the address stack is connected to an address port of a bus.

5. The data moving processor of claim 1, wherein the address stack is connected to an address line of a memory.

6. The data moving processor of claim 1, wherein the other data is used to perform calculations within the data moving processor.

7. The data moving processor of claim 1, wherein the address stack and general purpose stack are separately controlled using bytecode.

8. The data moving processor of claim 1, wherein each instruction contains one or more bytes.

9. The data moving processor of claim 8, wherein the address stack and general purpose stack are separately controlled using bytecode.

10. The data moving processor of claim 1, further comprising:
    a coprocessor interface.

11. The data moving processor of claim 10, further comprising:
    a plurality of coprocessors coupled to the coprocessor interface, wherein each coprocessor is assigned a unique identifier.

12. The data moving processor of claim 1, further comprising:
    a port interface.

13. The data moving processor of claim 12, further comprising:
    a plurality of ports coupled to the port interface, wherein each port is assigned a unique identifier.

14. The data moving processor of claim 7, wherein the bytecode comprises push and pop commands to move data between the general purpose stack and a coprocessor.

15. The data moving processor of claim 7, wherein the bytecode comprises push and pop commands to move data between the general purpose stack and a port.

16. The data moving processor of claim 7, wherein the bytecode comprises push and pop commands to move data between the general purpose stack and a memory.

17. The data moving processor of claim 1, further comprising:
    an address calculation unit coupled to the address stack.

18. The data moving processor of claim 1, further comprising:
    an arithmetic logic unit coupled to the general purpose stack.

19. The data moving processor of claim 1, further comprising:
a branch and loop circuit coupled to the address stack and the general purpose stack, the branch and loop circuit providing updated address data for use in movement of data from the general purpose stack to a destination address.

20. The data moving processor of claim 19, wherein the updated address data is calculated by incrementing or decrementing a pointer to a location in a memory.

21. The data moving processor of claim 20, wherein a set range of memory locations are assigned, and wherein the address data is updated in a circular manner so that the address data points to a first location in the memory range after pointing to a last location in the memory range.

22. A method for processing data, comprising:
loading program code from a code memory;
decoding instructions from the program code;
loading address data to an address stack;
loading other data to a general purpose stack in parallel to loading the address data to the address stack; and
moving data from the general purpose stack to a destination address identified from the address stack.

23. The method of claim 22, further comprising:
loading bytecode instructions to control the address stack and the general purpose stack.

24. The method of claim 23, wherein the bytecode instructions comprise push and pop commands to move data between the general purpose stack and a coprocessor, port, or memory interface.

25. The method of claim 22, further comprising:
loading data from the general purpose stack to an Arithmetic Logic Unit (ALU) for processing.

26. The method of claim 22, further comprising:
loading the address data from the address stack to an address calculation unit for processing.

27. The method of claim 22, further comprising:
controlling sequential movement of data using a branch and loop circuit.

28. The method of claim 22, wherein the destination address corresponds to a memory, a port, or a coprocessor.

29. The method of claim 23, wherein each bytecode instruction of the bytecode instructions does not contain a register address.

30. The data moving processor of claim 1, wherein each instruction does not contain a register address.

* * * * *